United States Patent [19]

Hirth et al.

[11] Patent Number: 5,380,500
[45] Date of Patent: Jan. 10, 1995

[54] PROCESS FOR SEPARATING VAPOROUS HEAVY METAL COMPOUNDS FROM A CARRIER GAS AND APPARATUS FOR CARRYING OUT THE PROCESS

[75] Inventors: Michael Hirth, Mellingen; Joachim Jochum, Baden; Harald Jodeit, Waldshut; Christian Wieckert, Baden, all of Switzerland

[73] Assignee: ABB Gadelius KK, Tokyo, Japan

[21] Appl. No.: 151,036

[22] Filed: Nov. 12, 1993

Related U.S. Application Data

[62] Division of Ser. No. 395,502, Aug. 18, 1989, Pat. No. 5,298,227.

[30] Foreign Application Priority Data

Sep. 5, 1988 [CH] Switzerland ............... 3311/88-5
Feb. 2, 1989 [CH] Switzerland ............... 359/89-3

[51] Int. Cl.6 .................... F01N 3/10; B01J 8/04; B01D 1/00; E01C 19/45
[52] U.S. Cl. .................... 422/173; 422/194; 422/207; 422/244; 422/255; 422/284; 422/285; 422/288; 95/132; 95/63; 95/78; 432/161; 126/343.5 R; 126/343.5 A; 96/55; 96/61
[58] Field of Search ............ 422/173, 194, 198, 203, 422/207, 236, 244, 255, 284, 285, 288; 55/23, 69, 72, 222, 267, 269; 95/132; 423/210, 215.5, 107, 108, 97, 89, 40, 1; 432/161; 126/343.5 R, 343.5 A; 62/10

[56] References Cited

U.S. PATENT DOCUMENTS

| 3,976,760 | 8/1976 | Tousaint. |
| 4,066,424 | 1/1978 | Kilgren et al. . |
| 4,261,707 | 4/1981 | Bradshaw et al. .............. 55/222 |
| 4,274,845 | 6/1981 | Howard ............................ 55/222 |
| 4,504,285 | 3/1985 | Modisette . |
| 4,750,916 | 6/1988 | Svensson ....................... 55/267 |
| 4,773,923 | 9/1988 | Scharf . |
| 4,813,978 | 3/1989 | Hirth et al. . |
| 4,986,347 | 1/1991 | Hirth et al. . |

FOREIGN PATENT DOCUMENTS

0188700  7/1986  European Pat. Off. .
2415169 10/1975  Germany .
61-29699  2/1986  Japan .

Primary Examiner—Robert J. Warden
Assistant Examiner—Christopher Y. Kim
Attorney, Agent, or Firm—Burns, Doane, Swecker & Mathis

[57] ABSTRACT

A process and apparatus for the separation of vaporous heavy metal compounds from a carrier gas wherein the heavy metal compounds are cooled and desublimed. An apparatus for carrying out this process has a melting furnace with a discharge opening for a gas/vapor mixture, which leads to a cooling device. Vaporous heavy metal compounds can be separated from a carrier gas on a large industrial scale. In addition, the apparatus for carrying out this process is easy to operate. The gas/vapor mixture is turbulently mixed immediately after the discharge from the furnace in a mixing section with cold air and is thus cooled. During this cooling, the vaporous heavy metal compounds desublime and are filtered as particles in a filter.

17 Claims, 8 Drawing Sheets

PROCESS FOR SEPARATING VAPOROUS HEAVY METAL COMPOUNDS FROM A CARRIER GAS AND APPARATUS FOR CARRYING OUT THE PROCESS

This application is a divisional, of application Ser. No. 07/395,502, filed Aug. 18. 1989, now U.S. Pat. No. 5,298,227.

BACKGROUND OF THE INVENTION

1. Field of the Invention

The invention starts from a process for separating vaporous heavy metal compounds from a carrier gas and desubliming them, in which the vaporous heavy metal compounds formed in a melting furnace are discharged together with the carrier gas as a gas/vapor mixture from this melting furnace and then desublimed. In particular, it also relates to an apparatus for carrying out this process, having a melting furnace with heating elements, in which a carrier gas forms a gas/vapor mixture with the vaporous heavy metal compounds, and having a discharge opening for the gas/vapor mixture, which leads to a cooling device.

2. Discussion of Background

It is known that vaporous heavy metal compounds can be discharged from melting furnaces by means of a carrier gas. When cooling of the discharged gas/vapor mixture then takes place in a cooling device, the vaporous heavy metal compounds are desublimed and a precipitate deposits in the cooling device. This precipitate must be removed from time to time, which can be carried out only by scraping out, with a comparatively large manual effort. This precipitate can be processed further only after this has been done. This process is too involved for large-scale industrial application.

SUMMARY OF THE INVENTION

Accordingly, one object of this invention is to provide a novel process for separating vaporous heavy metal compounds from a carrier gas, which process can be applied on a large industrial scale, and to provide an apparatus for carrying out this process, which is comparatively easy to operate.

According to one feature of the invention, a process is provided for separating vaporous heavy metal compounds from a carrier gas and desubliming them, in which the vaporous heavy metal compounds formed in at least one melting furnace are discharged together with the carrier gas as a gas/vapor mixture. The gas/vapor mixture is turbulently mixed immediately after the discharge in at least one mixing section with a cooling gas medium. Particles formed in the mixing section by desublimation of the vaporous heavy metal compounds and residues of the gas/vapor mixture form a fluid. The fluid is then passed through at least one filter which absorbs the particles.

According to the process of the invention, the carrier gas can be at least partially introduced into the melting furnace. The gas/vapor mixture can be discharged continuously or intermittently from the melting furnace. The gas/vapor mixture can be turbulently mixed in the mixing section with at least 10 to 100 times more by volume of the cooling gas medium. The flow velocity of the gas/vapor mixture flowing out of the melting furnace can be increased by reduced pressure in the mixing section and this reduced pressure can be maintained either by at least one suction fan located downstream of the filter or by blowing the cooling gas medium into the mixing section by a blower. Part of the cooling gas medium can sweep over the inside walls of the mixing section to prevent desublimation of the vaporous heavy metal compounds on the inside walls. The mixing section can be located at a distance close enough to the melting furnace so that the entire desublimation of the vaporous heavy metal compounds takes place in the mixing section. The cooling gas medium with remaining residues of the gas/vapor mixture can be passed downstream of the filter into an incineration unit or into a flue gas purification unit. The flue gas purification unit can be part of an already existing flue gas purification unit.

According to another feature of the invention, an apparatus is provided for separating vaporous heavy metal compounds from a carder gas and desubliming them. The apparatus includes at least one melting furnace with at least one heating element and in which a carrier gas forms a gas/vapor mixture with the vaporous heavy metal compounds. The furnace includes at least one discharge opening for the gas/vapor mixture which leads to at least one cooling device. The cooling device comprises at least one mixing section subjected to a reduced pressure immediately downstream of the discharge opening. The apparatus includes feed means for allowing a cooling gas medium to be fed in and to be mixed turbulently with the gas/vapor mixture in the mixing section so that particles can be formed in the mixing section by desublimation of the gas/vapor mixture and residues of the gas/vapor mixture form a fluid. The apparatus also includes at least one filter means provided downstream of the mixing section for absorbing the particles in the fluid.

The apparatus can include at least one suction fan provided downstream of the filter or at least one blower for feeding the cooling gas medium into the mixing section. The filter can be designed as an electrostatic filter or as a hose filter or as a fabric filter or as a combination of at least two of these filter types. The apparatus can include at least one cyclone provided tipstream of the filter. The filter can be interactively connected to an incineration unit or to a flue gas purification unit. The flue gas purification unit can be an already existing flue gas purification unit. The heating element can be isolated from an interior space of the melting furnace by at least one protective sheath.

The advantages achieved by the invention are essentially that a clean separation of the heavy metal compounds from the carrier gas is possible by simple means, without polluting the environment.

The invention, its further development and the advantages achievable thereby are explained in more detail below by reference to the drawings, which represent merely one embodiment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
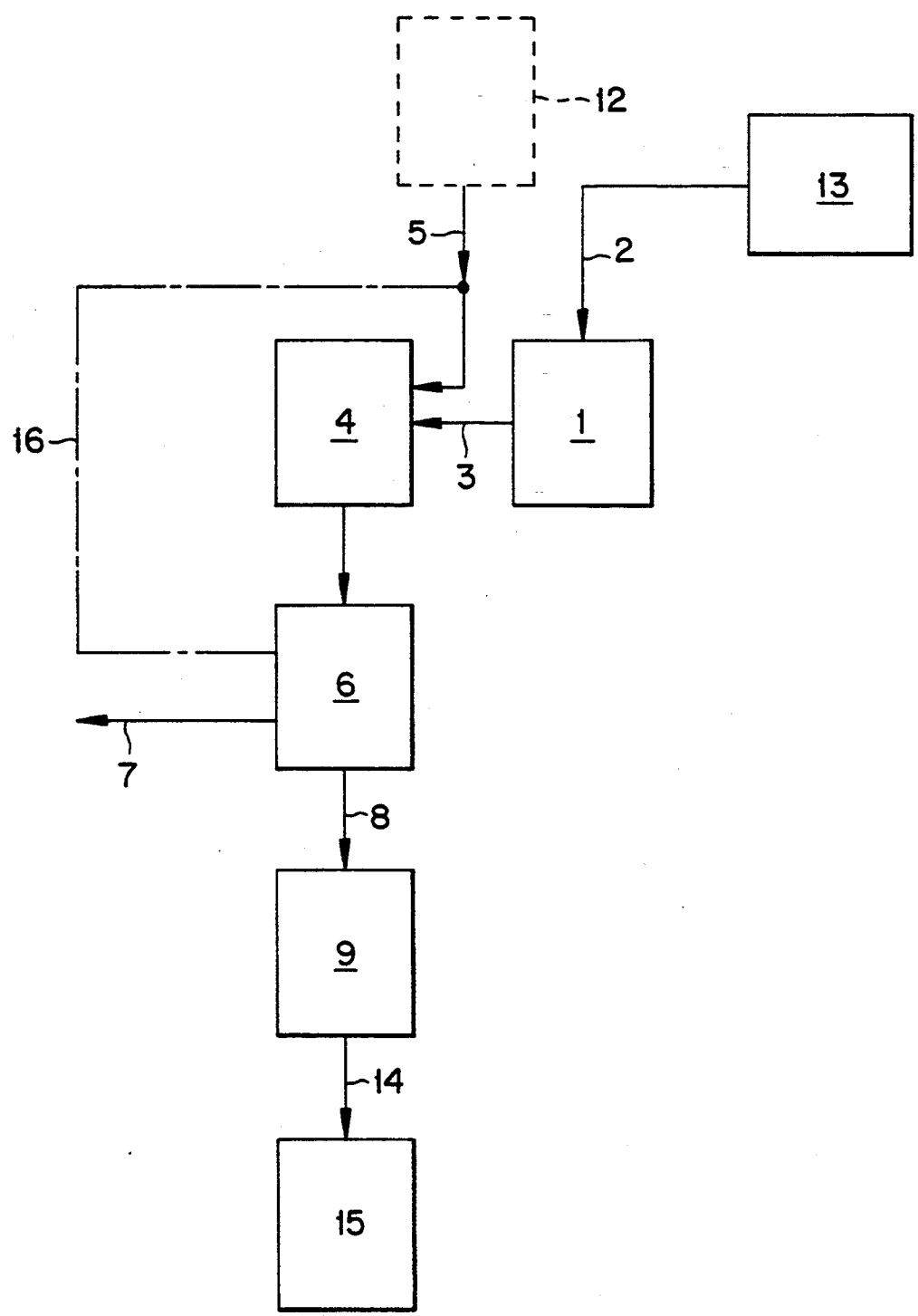
FIG. 1 shows a block diagram of a first embodiment of the process according to the invention.
Figure 2:
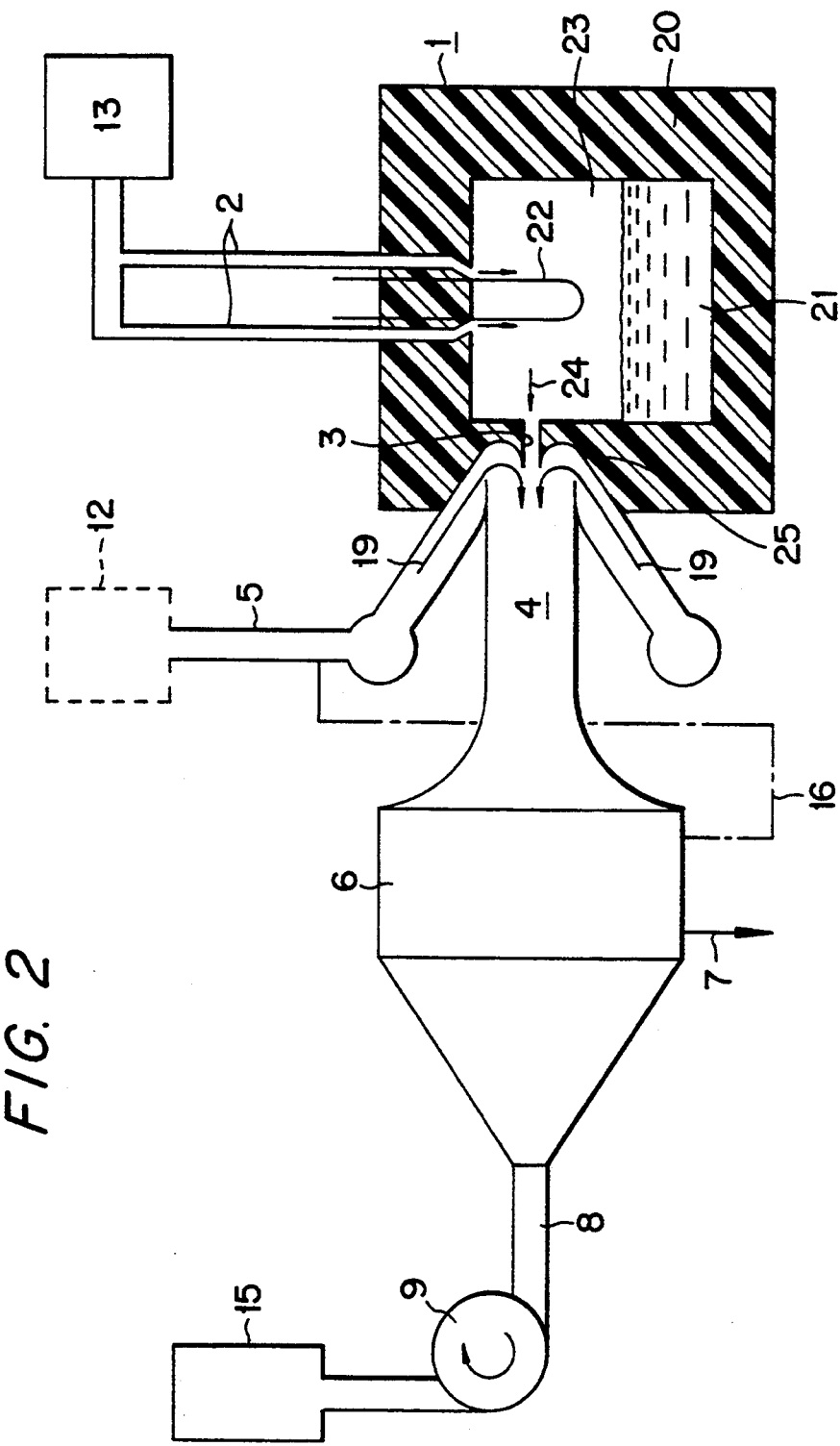
FIG. 2 shows a diagrammatic illustration of a first apparatus according to the invention.

Referring now to the drawings, wherein like reference numerals designate identical or corresponding parts throughout the several views, the blocked diagram in FIG. 1 shows a first process according to the invention, in which air is used as the carrier gas. A melting furnace 1 is provided with electric heating elements against which air is blown. Feeding of this blowing air into the melting furnace 1 is indicated by a line 2. The charging of the melting furnace with the particles to be melted and the discharge of the molten material are not shown here. In the melting furnace 1, the blowing air serves as a carrier gas for vaporous heavy metal compounds formed during melting. With the latter, it forms a gas/vapor mixture which is discharged through a discharge opening, here designated as line or discharge conduit 3. This line 3 must be made very short in order to prevent desublimation of the vaporous heavy metal compounds on the inner wall of the line 3. The line 3 leads into a mixing section 4, where a gas or gas mixture, which in this case is cold air, is additionally fed through a line or distribution conduit 5 to the gas/vapor mixture. In this mixing section 4, this distribution conduit 5 surrounds the discharge conduit 3 such that the cold air is turbulently mixed intensively with the hot gas/vapor mixture and the latter is cooled down thereby. The discharge conduit 3 and the distribution conduit 5 can be coaxial with each other as shown in FIG. 2. In this case, the distribution conduit 5 includes an arcuate deflector which deflects the cool gas or gas mixture radially inwardly and axially in a direction in which the gas/vapor mixture flows outwardly from the discharge conduit 3. The gas/vapor mixture is turbulently mixed with 10 to 100 times the quantity by volume of cold air. During this intensive cooling, the vaporous heavy metal compounds desublime and form particles. The condensation nuclei for these particles are tiny dust particles which are entrained by the vapor/gas mixture from the melting furnace 1, and spontaneous condensation also takes place. These particles are swept by the additional gas or gas mixture into a filter 6 and filtered out therein. The arrow 7 indicates the discharge of the particles which essentially consist of heavy metal compounds. Downstream of the filter 6, a line 8 carries the gas or gas mixture and remaining residues of the gas/vapor mixture into a suction fan 9. This suction fan 9 maintains the flow of the gas or gas mixture and, moreover, it generates a reduced pressure in the mixing section 4. In place of the suction fan 9, a blower 12 indicated in dashed lines can also transport cold air into the mixing section 4. A combination of blower 12 and suction fan 9 is also possible. The blowing air for blowing against the heating elements is fed by a blower 13 into the line 2. Downstream of the suction fan 9, a line 14 passes the gas or gas mixture and the remaining residues of the gas/vapor mixture into an incineration unit 15.

The process described can advantageously be used, for example, in a trash incineration unit, in the flue gas purification unit of which comparatively large quantities of filter dust laden with heavy metal compounds arise. This filter dust in particle form is smeltered in the melting furnace 1 and thus freed of the heavy metal compounds, and at the same time the volume of the filter dust is reduced. The cold air leaving the suction fan 9 and containing residues of the vapor/gas mixture is recycled into the furnace of the existing trash incineration unit and purified in the flue gas purification unit downstream of this furnace, so that an additional flue gas purification unit is not required. The heavy metal compounds discharged from the filter 6 can be taken for further processing to a metal smelter or treated for deposition in a dump. The molten material discharged from the melting furnace 1 is non-toxic and can be dumped without problems or used as a building material.

However, it is also conceivable that a part of the particulate hearty metal compounds discharged from the filter 6 are, as indicated by an interaction line 16, recycled and admixed to the gas or gas mixture which is fed through the line 5 to the mixing section 4. In the mixing section 4, these particulate hearty metal compounds serve as additional condensation nuclei which allow an accelerated desublimation of the turbulently mixed gas/vapor mixture.

A fluid consisting of the particles formed by desublimation, the residues of the gas/vapor mixture and the additionally fed gas or gas mixture is formed in the mixing section 4.

In FIG. 2, an apparatus is shown in which the process described above can be carried out. The melting furnace 1 is protected from heat losses by a thick insulation layer 20. The charging of the furnace and the discharge of the molten material from the melt 21 is not shown. The melt 21 is heated up by electric heating elements 22 against which air is blown; the flow required for this blowing is generated by a blower 13. The air which has flowed in is heated in a space 23 above the melt 21 and mixes with the vaporous heavy metal compounds and further gases such as, for example, $CO_2$ and $SO_2$, which are released on melting of the particles introduced into the melting furnace 1, for example filter dust particles, to give a gas/vapor mixture. This gas/vapor mixture leaves the melting furnace 1, as indicated by the arrow 24, through a line 3.

This line 3 must be very short, so that the temperature gradient in this line 3 does not lead to desublimation of parts of the gas/vapor mixture. The temperature in the interior of the melting furnace 1 is maintained at about 1300° C., and the exit temperature of the gas/vapor mixture from the line 3 must not fall below the temperature range from 800° C. to 900° C. It is advisable to arrange the line 3 with a downward slope towards the interior of the furnace, so that any desublimation products flow back from this line 3 into the melt 21 and can sublime once more. Depending on the chemical composition of the melt 21, the flow-back of these desublimation products can also be undesired, so that an outward slope of the line 3 and a facility for intercepting the outward-flowing desublimation products outside the melting furnace 1 are preferable in this case.

The short line 3 is immediately adjoined by a mixing section 4. Cold air is fed through a line 5 into the mixing section 4, as indicated by arrows 19. This air stream is maintained by a suction fan 9. Instead of the suction fan 9, however, the air stream can also be generated by a blower 12 which is indicated in dashed lines. A combination of suction fan 9 and blower 12 is also conceivable. In the mixing section 4, a comparatively small reduced pressure prevails, which accelerates the flow of the gas/vapor mixture through the line 3, with the object of ensuring that the desublimation of the vaporous heavy metal compounds takes place mainly in the mixing section 4. In addition, the insulation layer 20 is provided in a smaller thickness in a zone 25 in the region around the line 3, which allows, on the one hand, the line 3 to be made shorter and, on the other hand, makes room for theologically advantageous feeding of the cold air fed in from the line 5. In the mixing section 4, the gas/vapor mixture and this cold air fed in are vigorously mixed turbulently, whereby intensive cooling of the gas/vapor mixture is achieved. Particularly vigorous turbulent mixing car be achieved by baffles and similar known measures. The vaporous heavy metal compounds desublime, small dust particles entrained from the melting furnace 1 serving as condensation nuclei, and additionally spontaneous condensation also takes place. The resulting particles of heavy metal compounds are swept into a filter 6 and filtered out therein and then discharged, as indicated by the arrow 7. Downstream of the filter 6, a line 8 carries the gas or gas mixture with remaining residues of the gas/vapor mixture into the suction fan 9 and from there into an incineration unit 15. The entire area of the apparatus where vaporous heavy metal compounds occur is constructed to be gas-tight, in order to prevent an escape of harmful substances. The discharge indicated by the arrow 7 is constructed to be dust-proof, in order to avoid pollution of the environment by the particles of heavy metal compounds.

An illustrative example demonstrates that this apparatus according to FIG. 2 is operable. All the volume data in this example relate to standard pressure and room temperature of 20° C. The atmosphere in the space 23 of the melting furnace 1 is composed as follows:

95% of air (from the blowing against the heating element),
2% of heavy metal compounds condensed at room temperature, above all $ZnCl_2$, $PbO$, $PbCl_2$ etc., and
3% of $CO_2$, $SO_2$ etc.

The temperature in the furnace interior was about 1300° C. About 0.5 m³, which contained about 10 g of heavy metal compounds in the form of vapor, were discharged per hour through the line 3. The gas/vapor mixture entered the mixing section 4 at about 800° C. to 900° C. and was cooled down to about 100° C. to 150° C. by mixing with 20 times the quantity of cold air. If 100 times the quantity of cold air is fed in here, temperatures of about 50° result at the end of the mixing section. The diameter of the line 3 was 4 cm, and the diameter of the cylindrically shaped mixing section was 20 cm. The length of the mixing section 4 up to the filter 6 was 1 m. The filter 6 used was a paper filter of 0.35 m² area and less than 1 μm pore size. The paper filter was used here in order to facilitate the quantitative determination of the heavy metal compounds filtered out. An electrostatic filter was provided downstream of this paper filter. The degree of precipitation in these filters was higher than 98% with the particle sizes occurring. Downstream of the filter, the carrier gas had the following composition:

about 99.8% of air,
about 0.2% of $CO_2$, $SO_2$ etc., and
less than 0.001% of heavy metal compounds.

The temperature of the carrier gas had fallen to about 30° C.

The filter 6 can also be constructed as a hose filter, as a fabric filter or as an electrostatic filter, or as a combination of at least two of these filter types. The electrostatic filter in a self-cleaning design is particularly suitable for continuous operation. The other two filter types are suitable for filtering out particularly fine particles of heavy metal compounds. It is advantageous to provide a cyclone upstream of the filter 6, if comparatively large particles of heavy metal compounds arise, since these can already be discharged before entry to the filter 6.

If a part of the cold air fed into the mixing section 4 is passed along the inside wall of this mixing section 4, an undesired desublimation of this inside wall is reliably prevented and the mixing section 4 does not need to be cleaned on the inside.

The process described can be used both with continuous discharge of the gas/vapor mixture from the melting furnace 1 and with intermittent discharge. The control system of the apparatus for carrying out the process can be designed in such a way that both the abovementioned types of discharge are possible. It is likewise possible for the recycle, indicated by the interaction line 16, of particulate heavy metal compounds to be switched on and off as a function of the composition of the gas/vapor mixtures which are to be processed.

Figure 3:
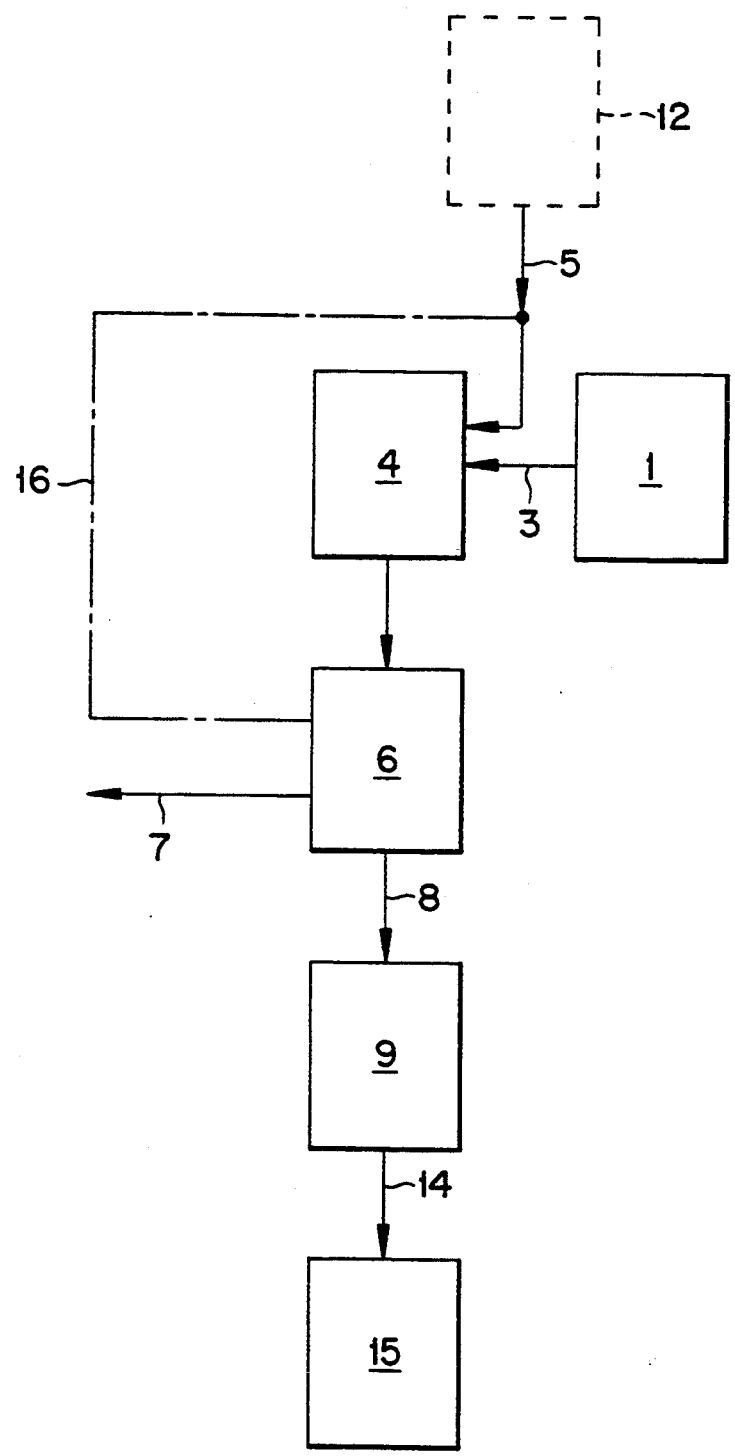
FIG. 3 shows a block diagram of a second embodiment of the process according to the invention.

In FIG. 3, a block diagram of a second process according to the invention is shown. It differs from the block diagram according to FIG. 1 only in that no carrier gas in the form of gas is introduced into the melting furnace 1, since there is no blowing against the heating elements in this melting furnace 1. In this case, the carrier gas used is a mixture of gases such as $CO_2$, $SO_2$ and similar compounds which are likewise formed during the melting of the introduced particles in the melting furnace 1, in addition to the vaporous heavy metal compounds. In the mixing section 4, cold air is then turbulently mixed with this gas/vapor mixture leaving the melting furnace 1, as already described. The remaining process steps are the same as have already been described.

Figure 4:
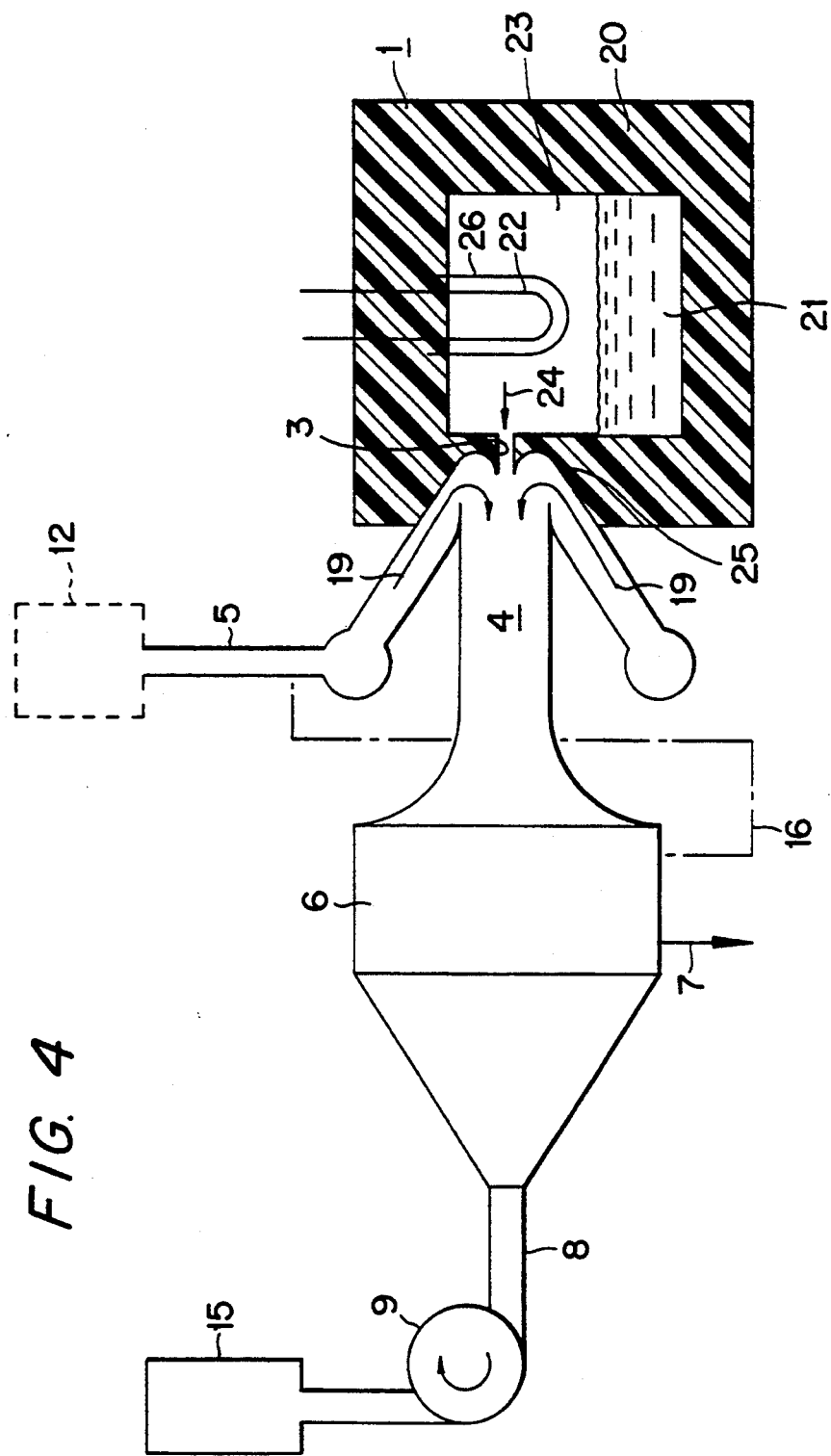
FIG. 4 shows a diagrammatic illustration of a second apparatus according to the invention.

In FIG. 4, the apparatus corresponding to the block diagram of FIG. 3 is shown. Air is no longer blown against the electric heating elements 22 and, instead, a protective sheath 26 surrounds each heating element 22 and isolates it from the interior space 23 of the melting furnace 2. The protective sheath 26 consists of a ceramic material with a high proportion of $Al_2O_3$ and is not attacked by the corrosive atmosphere in the space 23. In addition, the protective sheath 26 makes it impossible for particles, which have been whirled up during the introduction of the particles into the melting furnace 1, to be attached to the heating elements 22, to melt thereon and to attack their surface. The protective sheath 26 can be designed as a cap as shown, but it can also surround the particular heating element 22 as a U-shaped tube.

The following illustrative example demonstrates that the apparatus according to FIG. 4 is operable. The melting furnace 1 was charged with 300 g of filter dust per hour, of which 258 g per hour were discharged directly as a melt from the melting furnace 1. The discharged gas/vapor mixture amounted to 42 g per hour, of which 30 g per hour were intercepted as particles in the filter 6, whereas 12 g per hour were passed as residue of the gas/vapor mixture into the incineration unit 15. The melting furnace 1 was here operated at a temperature in the region of 1400° C.

When filter dusts are smeltered, a carrier gas such as, for example, a mixture of $CO_2$, $SO_2$ etc., is always formed, because corresponding compounds are always constituents of these filter dusts. However, the process according to the invention functions also with comparatively small and very small quantities of carrier gas and even in the case where no further vapors or gases are formed in the melt in addition to the vaporous heavy metal compounds. In this case, the vaporous heavy metal compounds concentrate in the space 23 in the interior of the melting furnace 1 until they flow out by themselves, or are discharged by the reduced pressure in the mixing section 4, for further processing.

Figure 5:
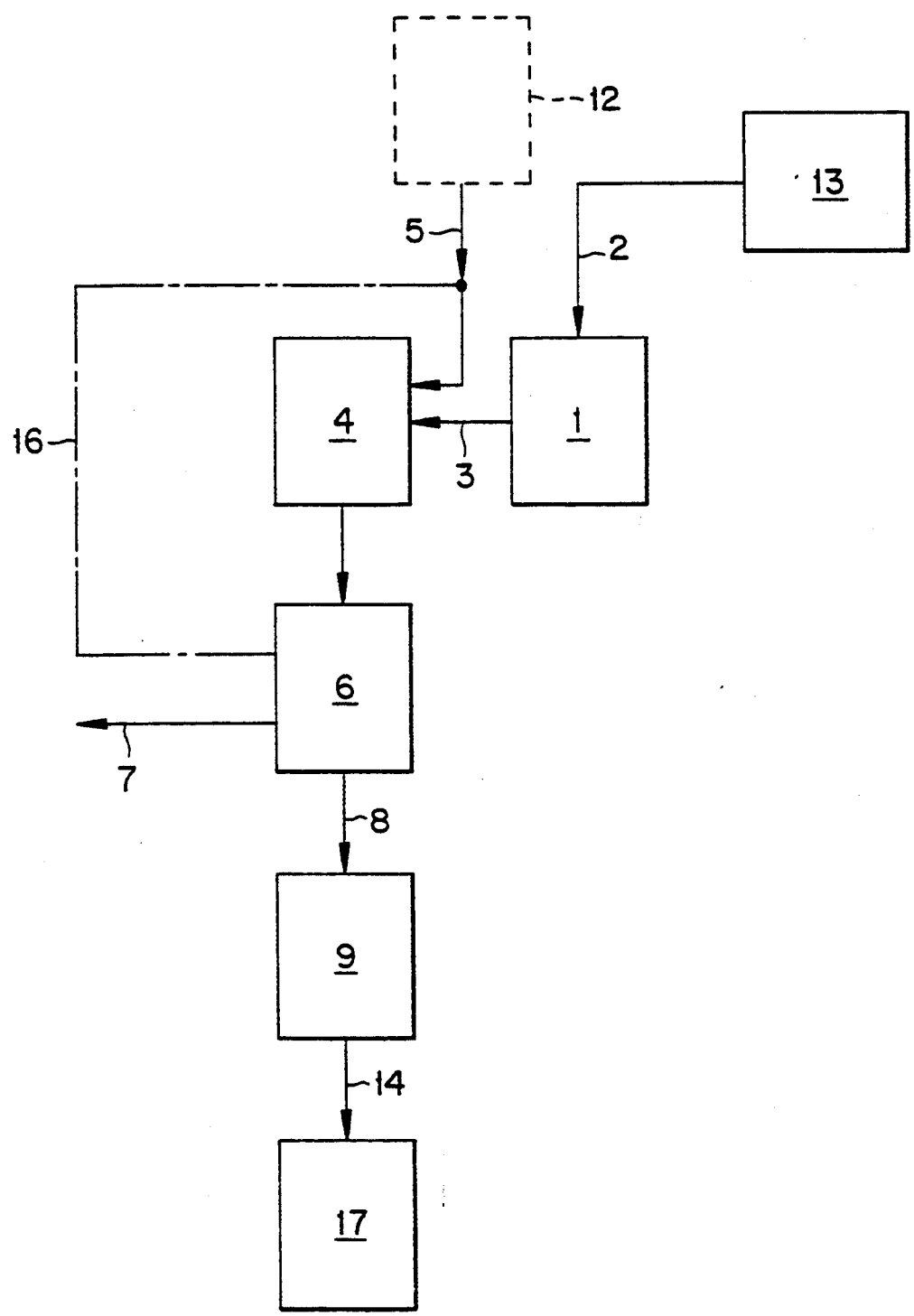
FIG. 5 shows a block diagram of a third embodiment of the process according to the invention.
Figure 6:
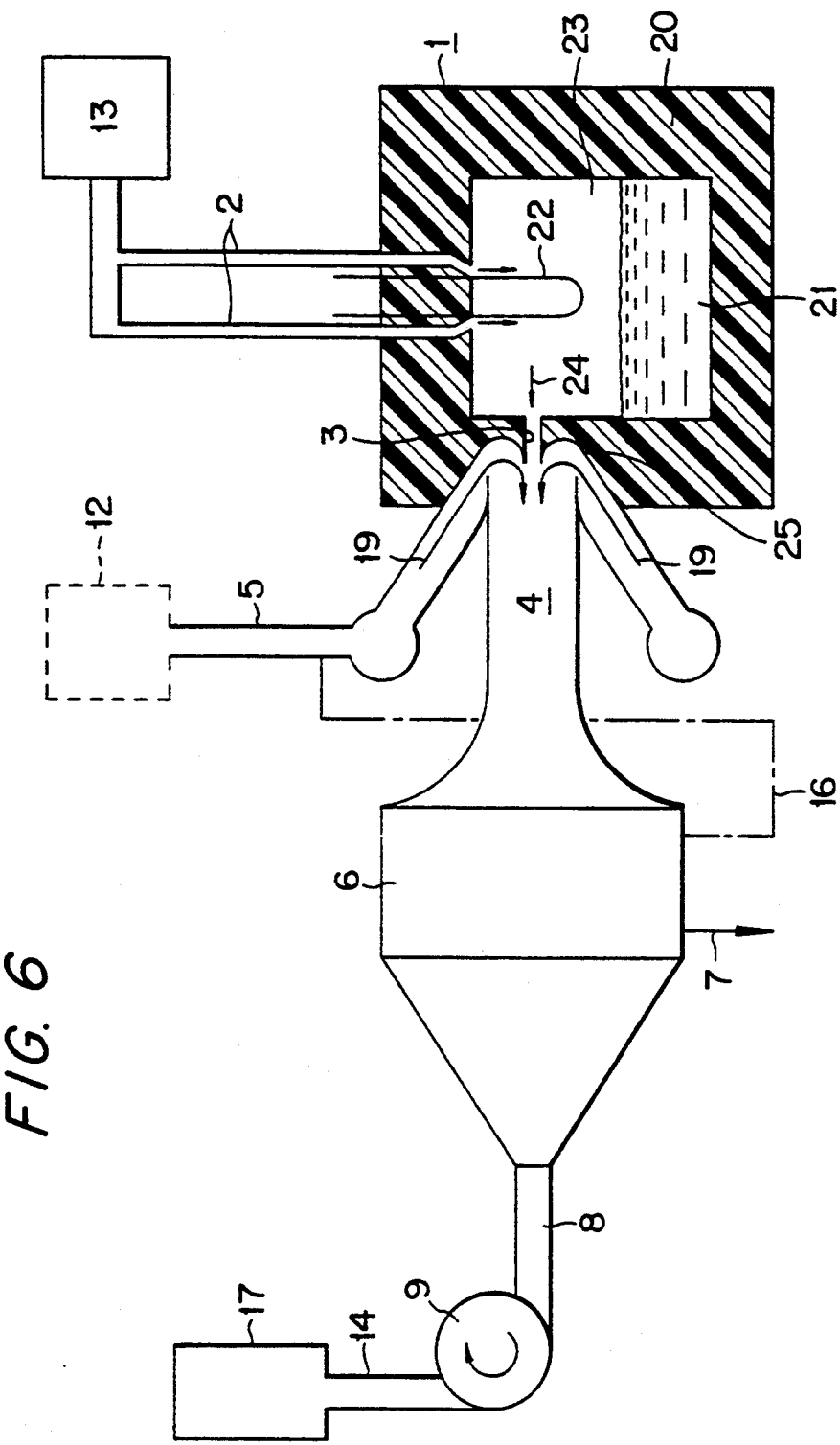
FIG. 6 shows a diagrammatic illustration of a third apparatus according to the invention.

FIG. 5 shows a block diagram of a third process according to the invention. This differs from the block diagram according to FIG. 1 merely in that, downstream of the suction fan 9, the gas or gas mixture and the remaining residues of the gas/vapor mixture are passed through the line 14 directly into a flue gas purification unit 17 and are purified in the latter. In FIG. 6, the apparatus corresponding to the block diagram in FIG. 5 is diagrammatically illustrated. The advantage of this arrangement is that no additional energy is required for heating up the comparatively large quantity of gas or gas mixture and the remaining residues of the gas/vapor mixture in an incineration unit. Moreover, since the volume of this quantity is not increased by heating, an already existing flue gas purification unit is used, so that there are no additional investment costs for the expensive flue gas purification. Especially in trash incineration units, a flue gas purification unit is as a rule already installed, so that the existing flue gas purification unit can also be used for the apparatus according to the invention. The filter ashes arising can therefore be made harmless very economically at the point where they are formed.

Figure 7:
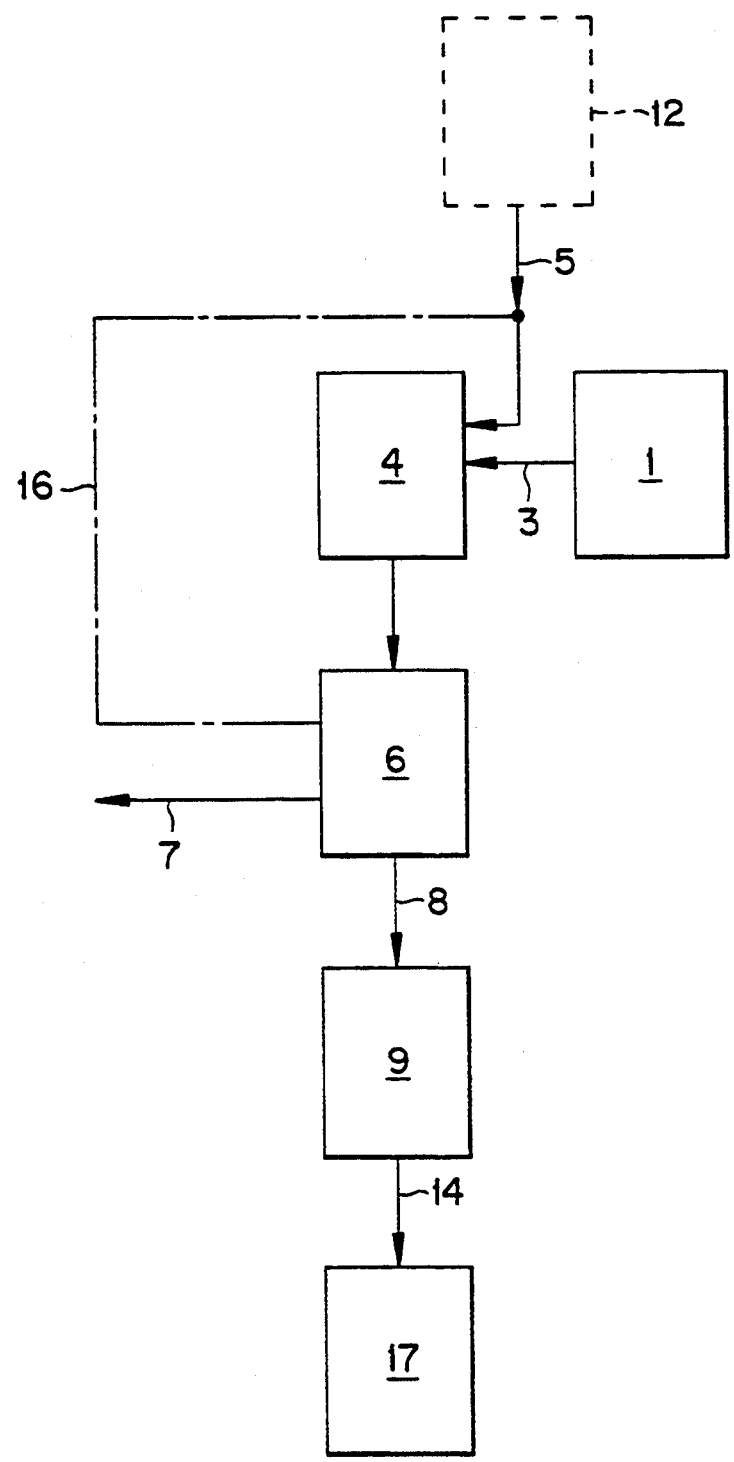
FIG. 7 shows a block diagram of a fourth embodiment of the process according to the invention.
Figure 8:
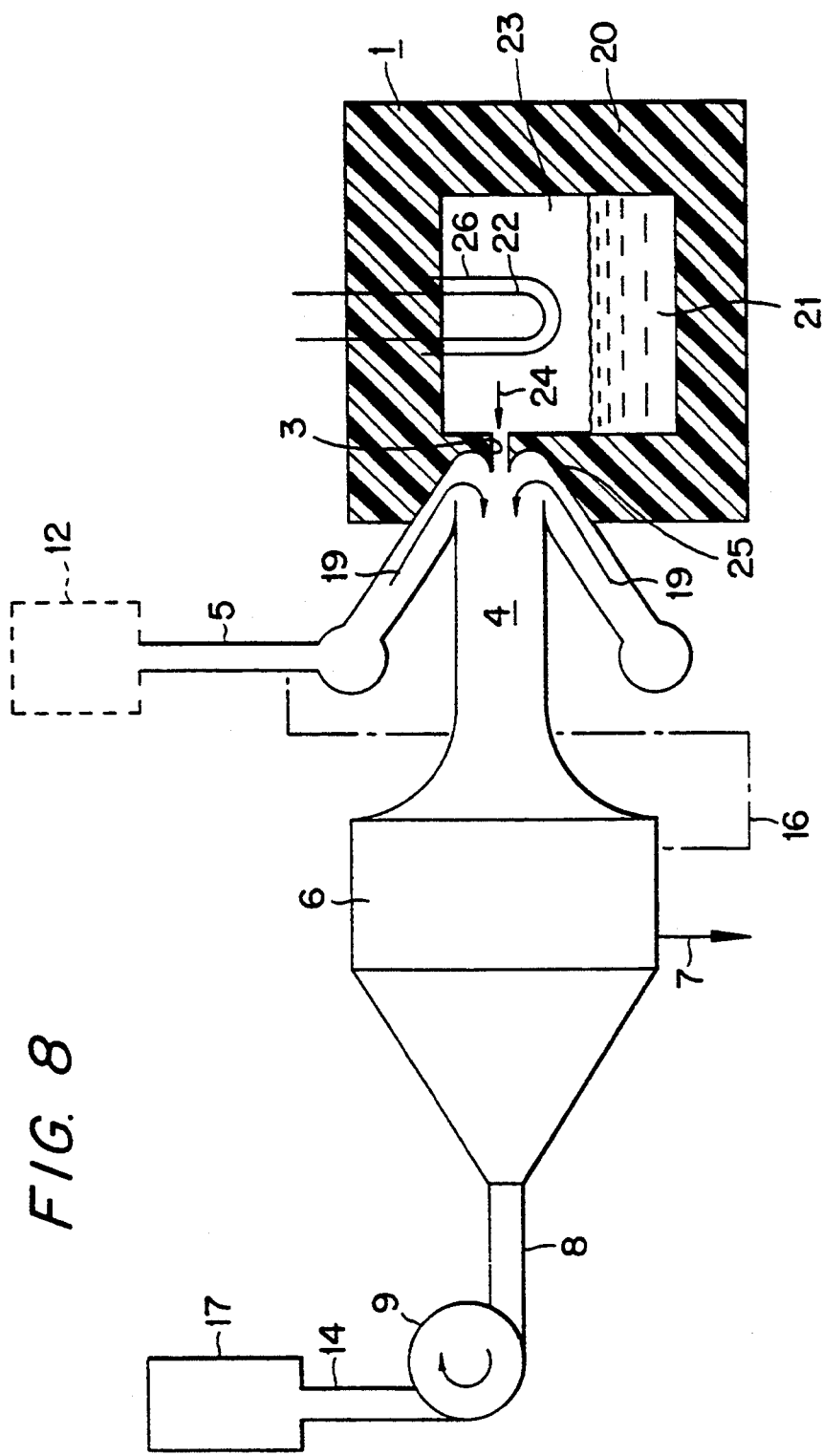
FIG. 8 shows a diagrammatic illustration of a fourth apparatus according to the invention.

In FIG. 7, a block diagram of a fourth process according to the invention is shown. It differs from the block diagram according to FIG. 3 merely in that the line 14 leads directly into a flue gas purification unit 17 downstream of the suction fan 9. In FIG. 8, the apparatus corresponding to the block diagram in FIG. 7 is shown. The advantages of this arrangement have already been described in connection with FIGS. 5 and 6.

Obviously, numerous modifications and variations of the present invention are possible in the light of the above teachings. It is therefore to be understood that, within the scope of the appended claims, the invention may be practiced otherwise than as specifically described herein.

What is claimed is:

1. An apparatus for separating vaporous heavy metal compounds from a carrier gas and desubliming the vaporous heavy metal compounds, comprising:
   at least one melting furnace means wherein vaporous heavy metal compounds formed during melting of particles are mixed with a carrier gas to form a gas/vapor mixture, the furnace means having at least one discharge opening for the gas/vapor mixture which leads to at least one cooling device;
   the cooling device comprising at least one mixing section immediately downstream of the discharge opening;
   means for reducing pressure of the gas/vapor mixture entering the mixing section;
   feed means for feeding a cooling gas medium in the mixing section so as to be mixed turbulently with the gas/vapor mixture and form particles in the mixing section by desublimation of the gas/vapor mixture, the particles and residues of the gas/vapor mixture forming a fluid; and
   at least one filter means provided downstream of the mixing section for absorbing the particles in the fluid.

2. The apparatus as claimed in claim 1, wherein at least one suction fan is provided downstream of the filter for feeding the cooling gas medium into the mixing section.

3. The apparatus as claimed in claim 1, wherein the filter comprises at least one filter selected from the group consisting of an electrostatic filter, a hose filter and a fabric filter.

4. The apparatus as claimed in claim 1, wherein at least one cyclone is provided upstream of the filter.

5. The apparatus as claimed in claim 3, wherein the filter is connected to an incineration unit.

6. The apparatus as claimed in claim 3, wherein the filter is connected to a flue gas purification unit.

7. The apparatus as claimed in claim 1, further comprising at least one heating element within an interior space of the melting furnace means and isolated from the interior space of the melting furnace means by at least one protective sheath.

8. The apparatus as claimed in claim 1, wherein a discharge conduit connects the discharge opening to an end of the mixing section located closest to the melting furnace means.

9. The apparatus as claimed in claim 1, wherein the apparatus further includes means for feeding particles of filter dust laden with heavy metal compounds from a trash incineration unit to the melting furnace means wherein the particles are melted to form the gas/vapor mixture.

10. The apparatus as claimed in claim 8, wherein the cooling device includes a distribution conduit, the discharge conduit and the distribution conduit being coaxial with each other, the distribution conduit including a deflector which deflects the cooling gas medium radially inwardly and axially in a direction in which the gas/vapor mixture flows outwardly from the discharge conduit.

11. The apparatus as claimed in claim 1, wherein the melting furnace means includes an electric heating element.

12. The apparatus as claimed in claim 1, wherein the feed means ensures that the cooling gas medium contacts the gas/vapor mixture immediately as the gas/vapor mixture enters the mixing section.

13. The apparatus as claimed in claim 1, wherein the feed means supplies air to the mixing section, the air comprising the cooling gas medium turbulently mixed with the gas/vapor mixture.

14. The apparatus as claimed in claim 1, wherein the melting furnace means includes at least one heating element within an interior of the melting furnace means, the heating element supplying heat for melting of the particles.

15. The apparatus as claimed in claim 1, wherein the melting furnace means includes carrier gas inlet means for supplying the carrier gas to an interior of the melting furnace means.

16. The apparatus as claimed in claim 1, wherein the discharge opening and cooling device are connected by a discharge conduit having a downward slope towards the melting furnace means so that desublimation products in the discharge conduit flow into an interior of the furnace means.

17. The apparatus as claimed in claimed 1, wherein the apparatus further includes at least one blower for feeding the cooling gas medium into the mixing section.

* * * * *